United States Patent
Etoh et al.

(10) Patent No.: US 7,389,578 B2
(45) Date of Patent: Jun. 24, 2008

(54) MANUFACTURING METHOD OF A PERPENDICULAR RECORDING MAGNETIC HEAD

(75) Inventors: Kimitoshi Etoh, Kanagawa (JP); Kikuo Kusukawa, Saitama (JP); Hisashi Kimura, Kanagawa (JP); Tomohiro Okada, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/645,104

(22) Filed: Dec. 21, 2006

(65) Prior Publication Data

US 2007/0186409 A1    Aug. 16, 2007

(30) Foreign Application Priority Data

Jan. 4, 2006   (JP)   ............................. 2006-000185

(51) Int. Cl.
G11B 5/127   (2006.01)
H04R 31/00   (2006.01)

(52) U.S. Cl. ............... 29/603.16; 29/603.13; 29/603.15; 29/603.18; 205/122; 216/62; 216/66; 216/67; 360/122; 360/317; 451/5; 451/41

(58) Field of Classification Search .............. 29/603.07, 29/603.13–603.16, 603.18; 216/62, 66, 67; 205/11, 122; 360/121, 122, 126, 317; 451/5, 451/41

See application file for complete search history.

(56) References Cited

U.S. PATENT DOCUMENTS

| 6,470,565 | B1 * | 10/2002 | Sasaki .................... 29/603.12 |
| 6,728,064 | B2 | 4/2004 | Sato et al. |
| 6,916,597 | B2 | 7/2005 | Kamijima et al. |
| 6,952,325 | B2 | 10/2005 | Sato et al. |
| 2002/0109946 | A1 | 8/2002 | Sato et al. |
| 2003/0151851 | A1 | 8/2003 | Sato et al. |
| 2004/0042118 | A1 | 3/2004 | Notsuke et al. |
| 2004/0257702 | A1 | 12/2004 | Kimura et al. |

FOREIGN PATENT DOCUMENTS

| JP | 2000268320 A * | 9/2000 |
| JP | 2003-203311 | 7/2003 |
| JP | 2005-018836 | 1/2005 |

* cited by examiner

*Primary Examiner*—Paul D Kim
(74) *Attorney, Agent, or Firm*—Townsend and Townsend and Crew LLP; Rambod Nader

(57) ABSTRACT

Embodiments in accordance with the present invention relate to methods wherein when a main pole is processed by using an ion milling technique, a re-adhesion layer created on the side face of the resist mask is removed with certainty. In one embodiment, an inorganic insulator from 5 nm to 100 nm which is soluble in an alkaline is arranged between the main pole material and a mask for processing the main pole material, and the main pole is processed by ion milling. After this process, the mask is peeled off, a surface treatment is performed by using an alkaline solution, resulting in the re-deposition film being removed.

10 Claims, 6 Drawing Sheets

MANUFACTURING METHOD OF A PERPENDICULAR RECORDING MAGNETIC HEAD

CROSS-REFERENCE TO RELATED APPLICATION

The instant nonprovisional patent application claims priority to Japanese Patent Application No. 2006-000185, filed Jan. 4, 2006 and incorporated by reference herein for all purposes.

BACKGROUND OF THE INVENTION

Embodiments in accordance with the present invention relate to a manufacturing method of a thin film magnetic head utilized for reading/writing to a magnetic disk system.

The needs for storing images and music, etc. in a hard-disk drive have been spreading rapidly to such an extent that they are seen as hard-disk drives added to video recorders and hard-disk drives built into televisions, etc. With the increase in image data, there is a demand for increased density, even in the longitudinal recording density of a magnetic disk drive. Currently, in order to achieve a high recording density of 100 Gbit/inch2 or more in a magnetic head, the transfer in technology from a longitudinal recording to a perpendicular recording has been progressing rapidly. This is due to thermal fluctuations of the magnetization which occur in the medium when the bit length is made smaller, and the longitudinal recording density cannot be increased in the case when a current longitudinal recording method is used.

On the other hand, in a perpendicular magnetic recording method, this thermal fluctuation can be avoided because it is magnetized in the perpendicular direction of the medium. Moreover, since a single pole head is used for recording, the magnetic loss is small, and since there is a soft under layer on the medium side, the recording ability is also improved. This also becomes a motivation for the aforementioned transfer to a perpendicular magnetic head. By the way, in this perpendicular write head, an improvement in the longitudinal recording density is required. In order to achieve this, it is necessary to reduce the write track width. However, the reduction of the recording track brings a decrease in the magnetic field applied to the magnetic recording disk from the tip of the main pole. In order to prevent this decrease in the magnetic field, a thicker film thickness of the main pole is preferable. On the other hand, in a magnetic disk system, it is necessary to read/write over a wide range from the inner radius to the outer radius of the magnetic recording disk. At this time, the read/write is performed in a state where the magnetic head has a skew angle of about 0 to 15° against the tangent in the rotation direction of the magnetic recording disk at the inner radius and the outer radius of the magnetic recording disk. In this case, a problem arises where the adjacent track is erased when the shape of the main pole at the air bearing surface is rectangular, so that the write track width cannot be reduced. To solve the problem, a so-called reverse-trapezoid shaped main pole is proposed, which will accommodate the narrow track width, that is, by the track width at the reading side of the main pole being made narrower than the width at the trailing side of the main pole. As a manufacturing method of a magnetic head having a reverse-trapezoid shaped main pole, a manufacturing method, especially applying an ion milling technique, is disclosed. For instance, JP-A No. 18836/2005 A discloses a manufacturing method applying an ion milling technique by using a resist, a non-magnetic insulation film, and a non-magnetic metal film as a mask. Moreover, JP-A No. 203311/2003 A discloses an ion milling angle for processing a reverse-trapezoid shape by using a buffer layer as a mask.

However, when a manufacturing method using an ion milling technique is applied to the aforementioned formation process of a main pole, a magnetic material which is a main pole material etched by ion milling, and alumina and an organic resin which are mask materials inevitably adhere again to the side face of the mask of the main pole in the track direction. The re-deposition film formed like this remains like a fence after removing the resist. If the re-deposition film remains, it brings such problems like the creation of a starting-point of voids during formation of alumina in the following process, and coverage failure, and, as another problem, a non-uniform plating failure occurs which is due to the failure of the under-layer while forming a shield for an improvement of the field gradient by plating. Thus, the yield not only is remarkably decreased, but it also causes a characteristic deterioration, and the reliability will be reduced when the re-deposition film remains.

BRIEF SUMMARY OF THE INVENTION

Embodiments in accordance with the present invention relate to methods wherein when a main pole is processed by using an ion milling technique, a re-adhesion layer created on the side face of the resist mask is removed with certainty. Referring to the embodiment of FIG. 3, an inorganic insulator 24 from 5 nm to 100 nm which is soluble in an alkaline is arranged between the main pole material 25 and a mask 30 for processing the main pole material, and the main pole is processed by ion milling. After this process, the mask is peeled off, a surface treatment is performed by using an alkaline solution, resulting in the re-deposition film 26 being removed.

DETAILED DESCRIPTION OF THE INVENTION

Figure 1A:
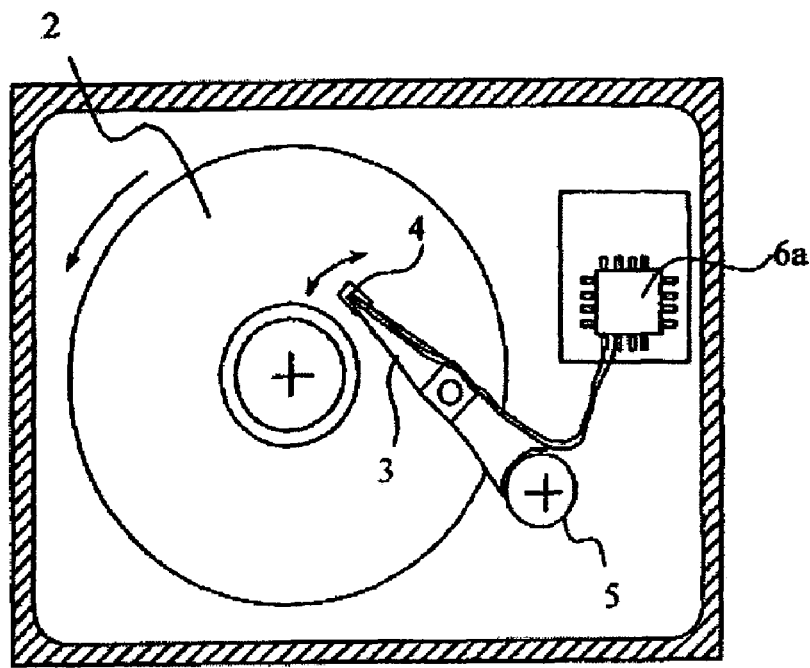
FIG. 1 are conceptual drawings of a magnetic disk system in operation.

An objective of certain embodiments in accordance with the present invention is to provide a manufacturing method of a main pole which enables removal of a re-deposition film considering the problem of the re-deposition film formation which is a result of ion milling.

In accordance with an embodiment of the present invention, for instance, an inorganic insulator and an organic resist film are formed over a main pole layer as a mask material to process a main pole. As an inorganic insulator film, a material such as $Al_2O_3$, $Al_2O_3$—$SiO_2$, etc. which are soluble in an alkali is used. During processing, a main pole material is first processed by an ion milling technique using a mask. After the process is completed, the organic resist film is removed and the re-deposition film which adheres to the side face of the mask according to ion milling processing is removed by etching a part of the inorganic insulator formed over the main pole material by using an alkaline solution.

The preferable thickness of the inorganic insulator is in a range from 10 nm to 100 nm. A non-magnetic metal film is formed in the gap of the main pole layer and the inorganic insulator to prevent oxidation of the main pole. Moreover, an FeCo film and a multilayer film of FeCo and a non-magnetic film formed by a sputtering method or CoNiFe and FeCo formed by a plating method are preferable as a main pole material.

By arranging an inorganic insulator which is soluble in an alkaline between the main pole material and the mask, the re-deposition film which is created like a fence on both faces of the mask during ion milling can be completely removed by dissolving the inorganic insulator by the alkali treatment. As a result, defects such as alumina voids in the following process can be prevented. Moreover, for instance, even in the case when a shield etc. is added around the main pole for improvement of the field gradient, plating failure does not occur and characteristic deterioration does not occur, thereby, a perpendicular recording magnetic head which has excellent manufacturability and high reliability can be supplied.

Hereafter, the embodiments of the present invention will be explained referring to the drawings. In the following drawings, the same reference codes are given to parts with a similar function.

Figure 1B:
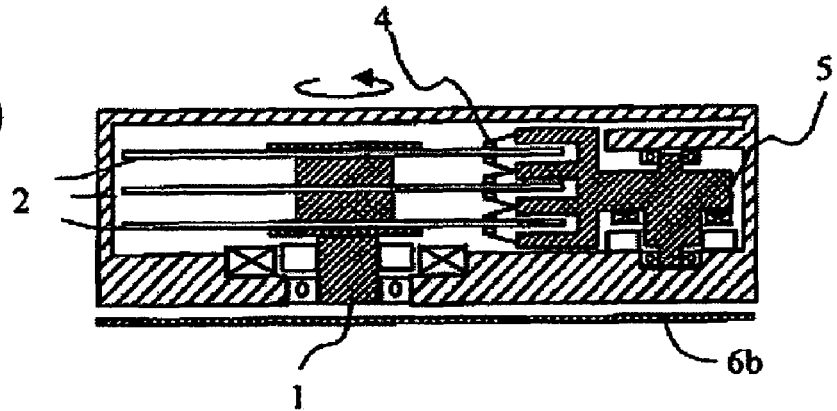

FIGS. 1(a) and (b) are conceptual drawings illustrating a magnetic recording system, and FIG. 1(a) is a plane schematic diagram and FIG. 1(b) is a cross-sectional schematic diagram. The magnetic recording system reads/writes a magnetic signal by using a magnetic head mounted on a slider 4 which is fixed at the tip of a suspension arm 3 at a predetermined position over a magnetic disk (magnetic recording disk) which is rotated by a motor 1. The position of the magnetic head in the direction of the radius of the magnetic disk (track) can be selected by driving a rotary actuator 5. A write signal to the magnetic head and a read signal from the magnetic head can be processed by the signal processing circuits 6a and 6b.

Figure 2:
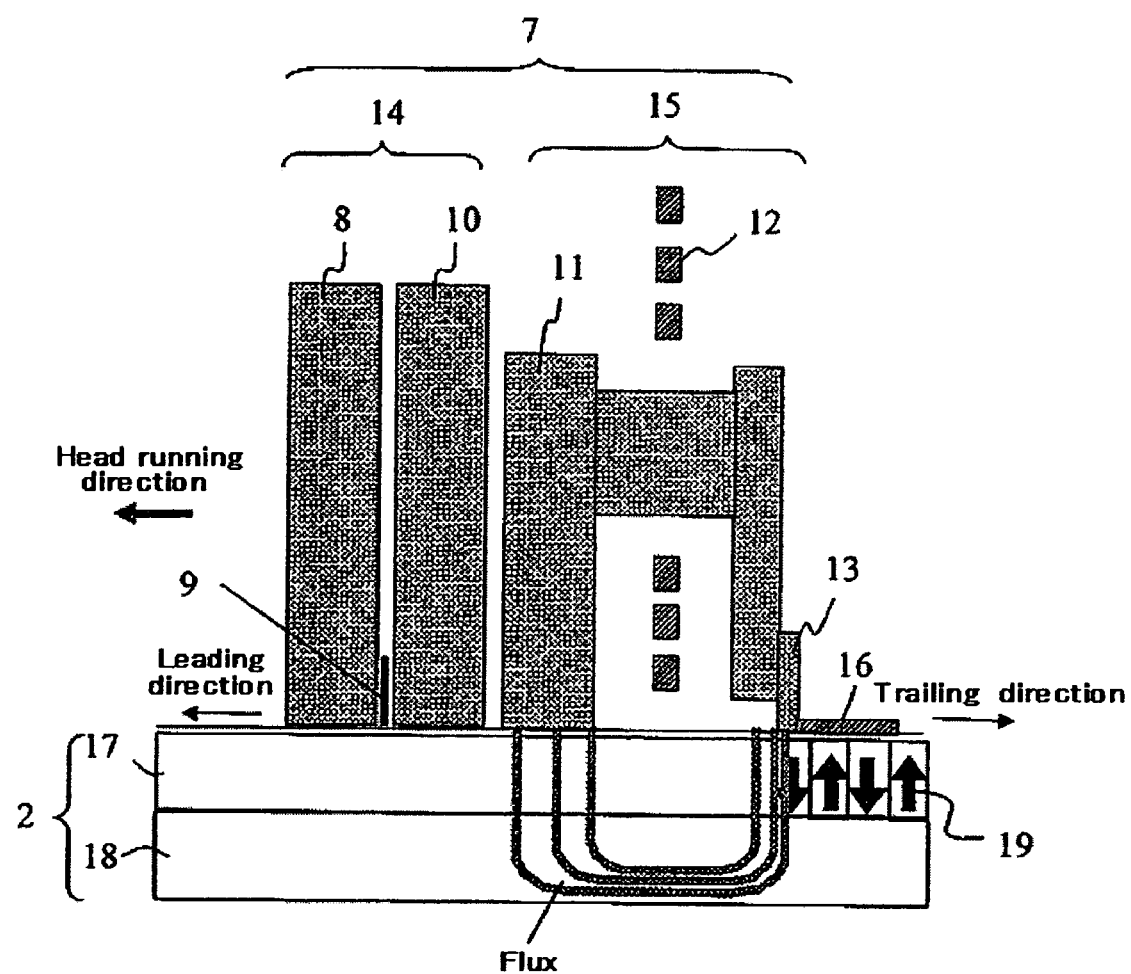
FIG. 2 is a schematic drawing of the operation of a perpendicular recording.

FIG. 2 is a drawing illustrating a relationship between a perpendicular magnetic head 7 and a magnetic disk 2 and an outline of a perpendicular recording. The perpendicular magnetic head 7 of the present invention consists of stacking a lower read shield 8, a read sensor 9, an upper read shield 10, an auxiliary pole 11, a thin film coil 12, and a main pole 13, in order, from the head motion side (reading side). The lower read shield 8, the read sensor 9, and the upper read shield 10 constitute a read head 14, and the auxiliary pole 11, the thin film coil 12, and the main pole 13 constitute a write head (single pole head) 15. A wrap around shield 16 is formed around the main pole 13. Considering the case where the head has a skew angle, the shape of the air bearing surface of the main pole 13 is made to be a reverse-trapezoid shape where the width of the reading side is narrower. The magnetic field coming out from the main pole 13 of the write head 15 passes a magnetic recording layer 17 and a soft under layer 18 of the magnetic disk 2, forms a magnetic circuit going into the auxiliary pole 11, and records a magnetic pattern 19 onto the magnetic recording layer 17. At this time, according to the relationship with the disk rotation direction, the position where the main pole 13 is last separated from a point of the magnetic disk, that is, the upper face of the main pole (trailing side), and the shape of the side face greatly influence the shape of the magnetization pattern. There is a case in which an intermediate layer is formed between the magnetic recording layer 17 and the soft under layer 18 of the magnetic disk 2. A giant magnetoresistive element (GMR) and a tunneling magnetoresistive element (TMR, CPP) are used for the read sensor 9 of the read head 14.

Figure 3:
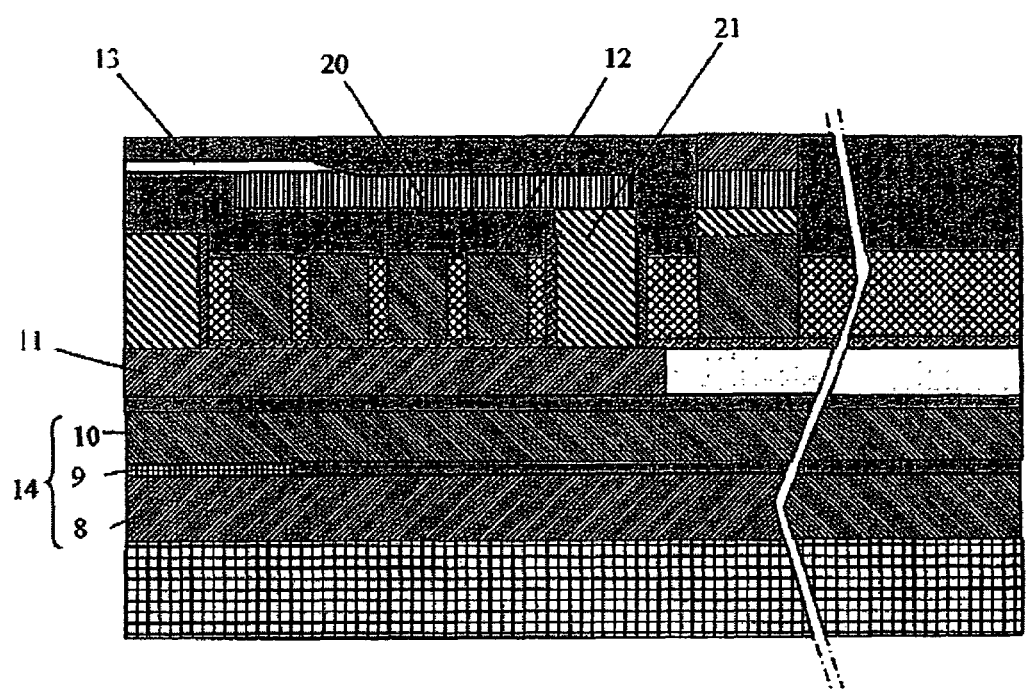
FIG. 3 is a cross-sectional drawing illustrating a perpendicular write head in the direction of the sensor height.

FIG. 3 is a cross-sectional drawing of a perpendicular write head in the direction of the sensor height. The structure thereof is such that the auxiliary pole 11 is connected to the main pole and the yoke 20 through the back gap 21, and the thin film coil 12 is formed enclosing the periphery of the back gap 21. Mainly, since a problem arises that the adjacent track is erased according to the skew angle, a reverse-trapezoid shape is adopted for the shape of the air bearing surface of the main pole 13 to prevent it. In order to achieve this shape, an organic resin such as a resist, etc. is patterned and a desired shape is processed using it as a mask by an ion milling technique. When the main pole is processed by using an ion milling technique, a fence-like re-deposition film is formed with certainty on the side face of the mask. This re-deposition film cannot be completely removed with a resist removal liquid etc. used in the following resist removal process. A feature of the present invention is that the re-deposition film created by ion milling can be completely removed.

FIGS. 4(a) to (e) are a chart which explains in detail a manufacturing process of a typical embodiment. As shown in a schematic cross-sectional drawing of FIG. 4(a), it is a structure where an inorganic insulator 24 which is soluble in an alkaline is formed over the main pole layer 25 and the two-layer resist 30 is formed over the inorganic insulator 24. An FeCo film or a multilayer film of FeCo/NiCr formed by using a sputtering equipment is preferable for the main pole layer 25, and a single layer film of FeCo or CoNiFe formed by using a plating technique may be acceptable. Moreover, a non-magnetic metal film was formed over the main pole layer to prevent corrosion caused by oxidation and to improve the process margin. NiCr, Cr, and Ta are suitable for this non-magnetic metallic layer. Moreover, considering milling in the following process, the preferable film thickness of this non-magnetic metallic layer is in a range from 5 to 20 nm. In this embodiment, an FeCo/Cr multi-layer formed by using a sputtering technique is used for the main pole layer 25 and the film thickness thereof is controlled to be 200 nm. Moreover, NiCr is used for the non-magnetic material on the main pole layer and the film thickness thereof is controlled to be 5 nm.

A material which is soluble in an alkaline such as alumina and alumina oxide, etc. is suitable for the inorganic insulation layer 24. Herein, alumina was used. The ion milling rate of alumina is low compared with the main pole material, FeCo/Cr. Therefore, the film thickness of alumina was controlled to be 50 nm. Considering the ion milling process time and the film thickness of the resist film corresponding to it or considering the inorganic insulator film becoming a trailing gap, it is preferable that the film thickness of this inorganic insulator is in the range from 5 nm to 100 nm. Moreover, the two-layer resist (22/23) is used for the resist mask 30 for processing. An organic resin which has no photosensitivity is used for the lower resist 23 and the film thickness is controlled to be 1.0 µm. A polyimide resin and a novolac resin may be used for this organic resin. The lower resist 23 mainly works as a mask for ion milling. Furthermore, a resist containing Si was used for the upper resist 22 and the film thickness is controlled to be 0.4 µm. The film thickness of this upper layer/lower layer resist is determined by the film thicknesses of the inorganic insulator and the main pole. The upper resist 22 is used for patterning the lower resist 23. Pattern formation of the upper resist 22 was carried out under the conditions of an exposure of 23 mj/cm2 and F=−0.1 μm by using a KrF excimer laser stepper.

Figure 4A:
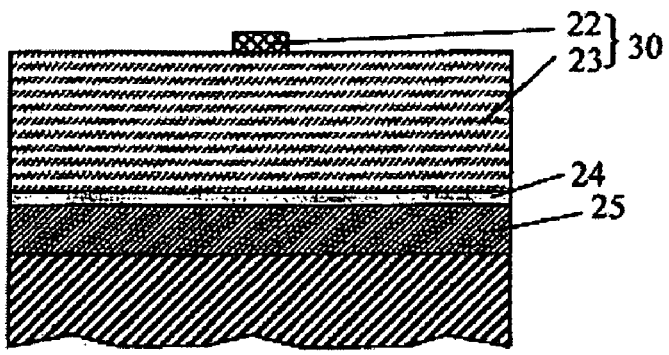
FIGS. 4(a)-(e) are drawings illustrating a typical embodiment in accordance with the present invention.
Figure 4B:
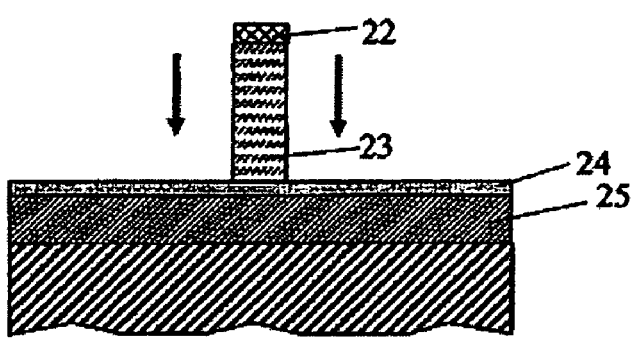
Figure 5:
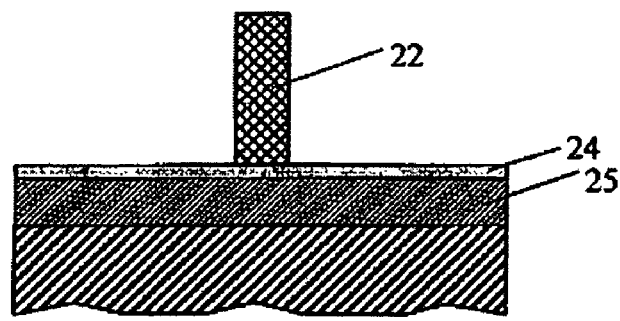
FIG. 5 is a drawing where a single-layer resist is applied to a resist mask.

FIG. 4(b) is a cross-sectional schematic drawing illustrating a state where the lower resist 23 is patterned by using the upper resist 22 as a mask. In this process, Reactive Ion Etching (hereinafter, it is called RIE) using $O_2$ gas is used for etching the lower resist. An RIE which generates a high density plasma is used for the system and the conditions are controlled to be Rf=300 W, Rbias=160 W, O2 pressure=0.3 Pa, and a flow rate=40 sccm. As a result, a mask having high perpendicularity as shown in FIG. 4(b) can be obtained. Furthermore, as another embodiment, FIG. 5 is a cross-sectional schematic drawing in the case when a mask is formed by ion milling only using the upper resist. In this way the shape of a single-layer may also be used as the mask.

Figure 4C:
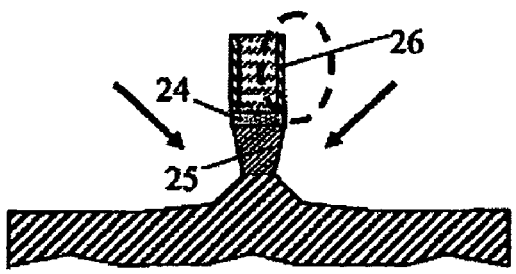

FIG. 4(c) is a cross-sectional schematic drawing illustrating a state where the main pole layer 25 is processed in a reverse-trapezoid shape by an ion milling technique using a mask formed by a two-layer resist. The condition of ion milling is as follows. The ion milling is first performed in a perpendicular direction at −30° and from a horizontal direction at an angle of −75°. Since the ion milling rate of alumina which is the inorganic insulator 24 is lower than that of the main pole layer 25, the process for fabricating the reverse-trapezoid shape shown in FIG. 4(c) becomes possible when the ion milling is performed under the same conditions. As a result, after the milling process, the re-deposition film 26 composed of alumina, FeCo, and the resist which are enclosed by the circle in the figure is inevitably formed at the side face of the lower resist 23.

Figure 4D:
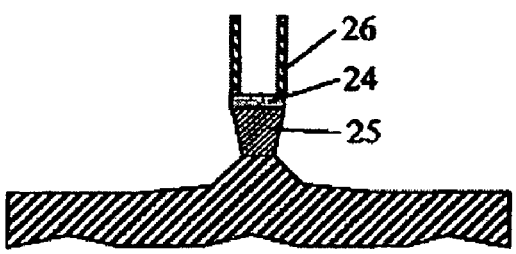

FIG. 4(d) is a cross-sectional schematic drawing illustrating a state after removal of the lower resist. After removing the lower resist, ultrasonic cleansing is carried out using an $O_2$ asher and a resist removal liquid. However, even if such a means is applied, it is impossible to completely remove the re-deposition film 26 and the re-deposition film 26 remains inevitably on the inorganic insulator 24 as shown in the figure. If the thick alumina formation which is the next process is performed while the fence-like re-deposition film 26 remains, it becomes a starting-point for a void, resulting in the yield and the reliability being made worse. Moreover, when a shield is formed around the main pole or on the main pole in other process, stepping of the under layer occurs which causes plating failure. Therefore, the re-deposition film 26 should be completely removed.

Figure 4E:
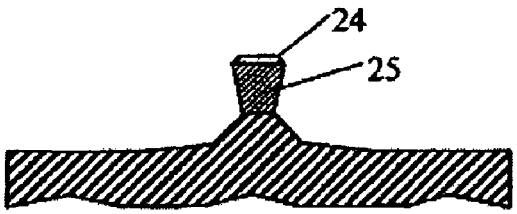
Figure 6:
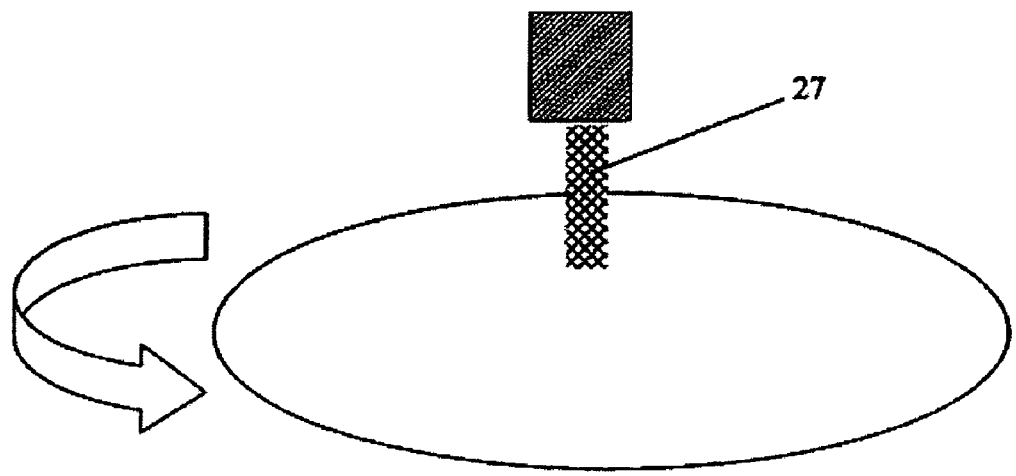
FIG. 6 is a drawing illustrating a configuration of an alkali treatment.

FIG. 4(e) is a cross-sectional schematic drawing illustrating a state after the application of an alkaline treatment for the purpose of removing the re-deposition film 26. A removal technique by a spin-coater using a typical resist developing solution was adopted for the alkaline treatment as shown in FIG. 6. In addition, as an alkaline treatment solution 27, NMD-3 made by TOK was used. The pH is 13.

A point of the present invention is a process in which an alkaline treatment solution is used for removal of the re-deposition film. Specifically, the main component of the re-deposition film is alumina, and attention is paid to the point where alumina is dissolved in the alkaline. Moreover, another feature of the present invention is that the re-deposition film 26 created on the inorganic insulator 24 can be completely removed with the inorganic insulation material by light-etching the inorganic insulator (alumina) 24 in the alkaline treatment. The etching rate with respect to alumina is about 6 nm/min. In accordance with an embodiment of the present invention, the alkaline treatment is performed by using a paddle method. The re-deposition film 26 could be completely removed from the entire surface of the wafer by etching the alumina film thickness by about 20 nm. Moreover, in the case when a part of the alumina constituting the inorganic insulator 24 is dissolved like this, the edge of the inorganic insulator 24 may become rounded.

According to this embodiment, a main pole without a re-deposition film could be formed and a perpendicular write head with high reliability could be manufactured. Moreover, according to a perpendicular write head in accordance with an embodiment of the present invention, the track density and the linear recording density could be improved, and a magnetic recording system having a areal recording density of 150 Gbit/in2 or more could be manufactured.

Figure 7:
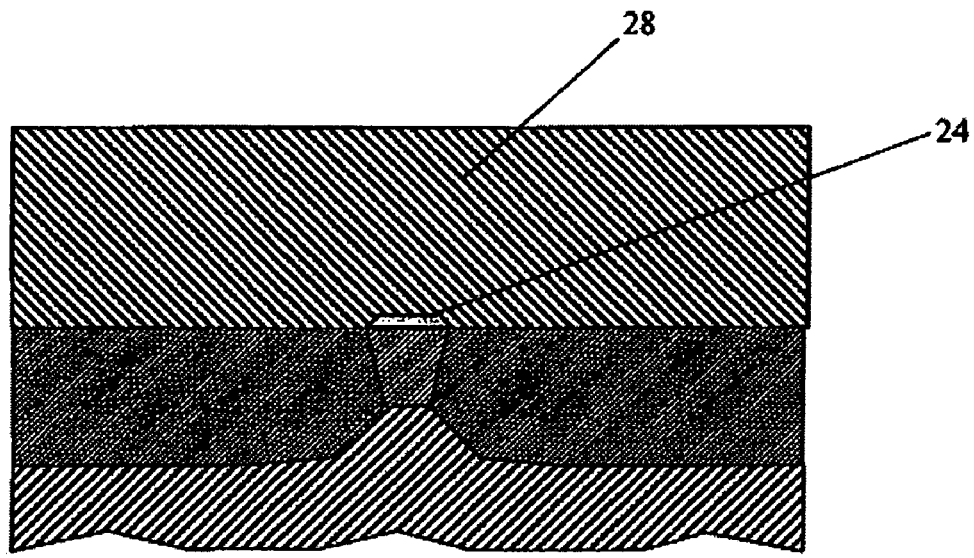
FIG. 7 is a drawing where an embodiment of the present invention is applied to a trailing shield.
Figure 8:
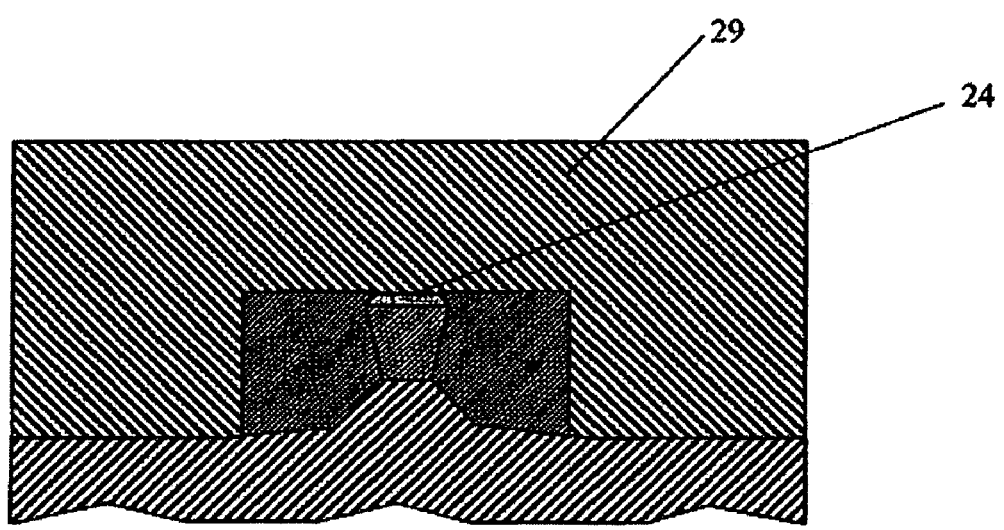
FIG. 8 is a drawing where an embodiment of the present invention is applied to a wrap around shield.

FIG. 7 is a schematic drawing illustrating another embodiment of the present invention. The inorganic insulator 24 for removing the re-deposition film can be used for a magnetic gap between the trailing shield 28 and the main pole by leaving it as is on the main pole. FIG. 8 is a schematic drawing illustrating another embodiment of the present invention. As shown in FIG. 8, the inorganic insulator 24 can be used as a magnetic gap of the wrap around shield 29.

What is claimed is:

1. A manufacturing method of a perpendicular write head comprising:
    forming a main pole layer,
    forming an inorganic insulator over said main pole layer,
    coating a masking material over said inorganic insulator and forming a mask by patterning it,
    processing a main pole by ion-milling said main pole layer using said mask,
    removing said mask,
    dissolving a part of the inorganic insulator over said processed main pole by using an alkaline solution.

2. The manufacturing method of a perpendicular write head according to claim 1, wherein
    in a process for forming said mask, said mask is prepared by coating a first organic resist film over said inorganic insulator film, coating a second organic resist film over said first organic resist film, patterning said second organic resist film, and etching said first organic resist film by using said patterned second organic resist layer as a mask.

3. The manufacturing method of a perpendicular write head according to claim 1, wherein
    said inorganic insulator film is dissolved in an alkali.

4. The manufacturing method of a perpendicular write head according to claim 1, wherein
    a shape of said inorganic insulator film is one where the edges of both ends in a track width direction of said main pole are made round after a part thereof is dissolved in a alkaline solution.

5. The manufacturing method of a perpendicular write head according to claim 1, wherein
    in a process for making said mask, said mask is prepared by coating a resin having no photosensitivity over said inorganic insulator, coating an organic resist film thereon, patterning said organic resist film, and etching said resin having no photosensitivity by using said patterned organic resist film as a mask.

6. The manufacturing method of a perpendicular write head according to claim 1, wherein
    a film thickness of the inorganic insulator formed over said main pole layer is in a range from 10 nm to 100 nm.

7. The manufacturing method of a perpendicular write head according to claim 1, wherein
    a non-magnetic metal film is formed between said main pole layer and said inorganic insulation layer.

8. The manufacturing method of a perpendicular write head according to claim 7, wherein
said non-magnetic metal film is composed of one selected from NiCr, Cr, and Ta.

9. The manufacturing method of a perpendicular write head according to claim 8, wherein
a film thickness of said non-magnetic metal film is in a range from 5 nm to 20 nm.

10. The manufacturing method of a perpendicular write head according to claim 1, wherein
said main pole layer consists of an FeCo film or a multi-layer film of an FeCo film and a non-magnetic film formed with a sputtered film, or a CoNiFe film or an FeCo film formed by a plating method.

* * * * *